Figure 1:
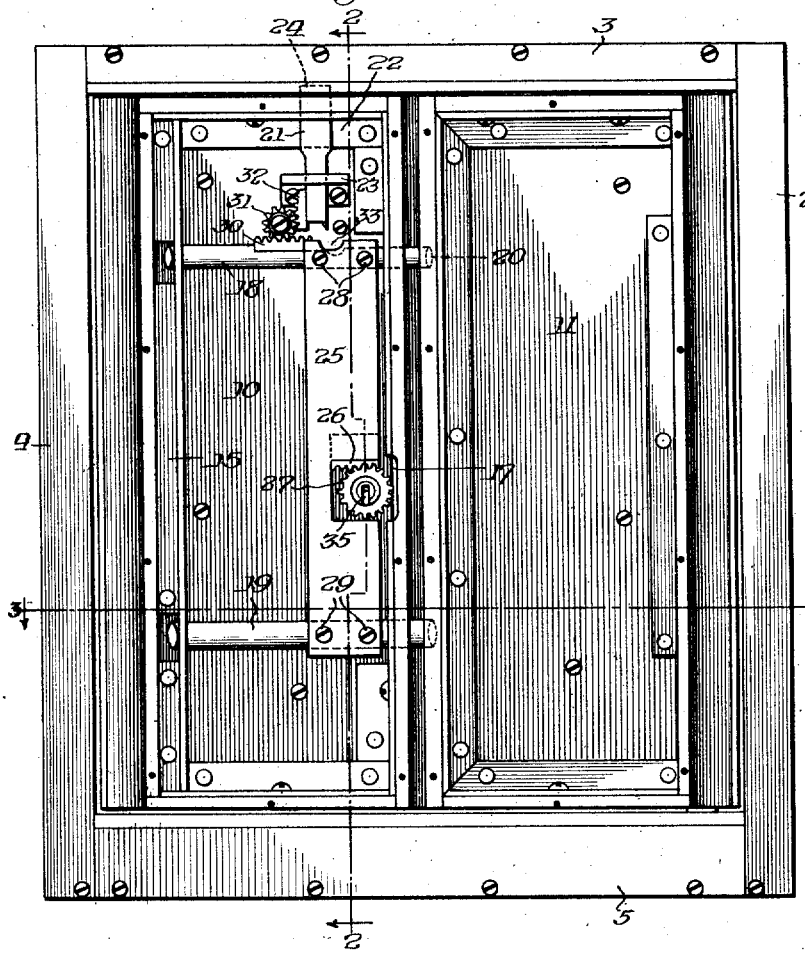

April 3, 1928. Re. 16,919

J. J. MARIOTTI

SAFE LOCK

Original Filed March 12, 1925

Witness:
Geo. E. Lorum

Inventor:
Joseph J. Mariotti,
By Ira J. Wilson
Atty

Reissued Apr. 3, 1928.

Re. 16,919

UNITED STATES PATENT OFFICE.

JOSEPH J. MARIOTTI, OF CHICAGO, ILLINOIS, ASSIGNOR TO DAPRATO STATUARY COMPANY, OF CHICAGO, ILLINOIS, A CORPORATION OF ILLINOIS.

SAFE LOCK.

Original No. 1,577,335, dated March 16, 1926, Serial No. 14,864, filed March 12, 1925. Application for reissue filed December 21, 1927. Serial No. 241,707.

This invention relates to locking mechanisms for safes and more particularly to locking mechanism for double door safes or vaults for tabernacles or other uses.

A primary object of this invention is to provide a simple and inexpensive, yet efficient and reliable locking mechanism whereby the double doors of safes may be securely locked together and to the frame or body of the safe.

Another object is to provide a safe door locking mechanism which may be operated by an ordinary tumbler release or other key for operating the locking bolts and for swinging the doors without the provision of handles, knobs, or the like, commonly used for the purpose.

Figure 2:
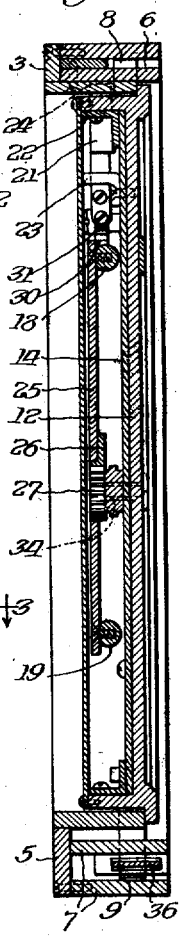
Figure 3:
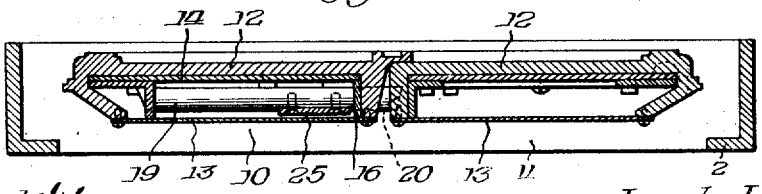
Figure 4:
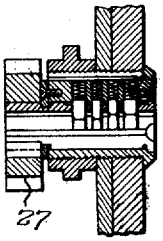

Further objects and advantages of the invention will appear from the description and claims and from the drawing in which:

Fig. 1 is a front elevation of a safe embodying a locking mechanism constructed in accordance with the invention, the front plates of the doors being removed to show the interior construction, Fig. 2 is a vertical section taken along the line 2—2 of Fig. 1, Fig. 3 is a horizontal section taken along the line 3—3 of Fig. 1, and Fig. 4 is an enlarged fragmentary sectional detail of the key lock barrel and associated mechanism taken substantially along the line 2—2 of Fig. 1, showing an old and well known type of lock tumbler mechanism associated therewith.

The safe body is of any usual construction comprising side, top and bottom frame body members 2, 3, 4 and 5, suitably secured together and forming, together with members 6 and 7, the safe inclosure. Suitably hinged within the top and bottom or side members of the body as at 8 and 9 are a pair of doors generally designated 10 and 11, each consisting of a heavy steel backing frame 12 and a front plate 13 secured thereto as by rivets or screws as may be preferable. Mounted against the frame member 12 within one of the doors, in this instance, within the door 10, is a plate 14 carrying an L-shaped guide member 15 and a second guide member of any suitable shape 16 cut away as at 17 (for a purpose to be described) for the purpose of supporting and guiding a pair or any other suitable number of horizontally slidable bolts 18 and 19 adapted to be received in suitable recesses 20 formed in the cooperating edge face of the opposite door. A vertically movable bolt 21 is slidably carried in guide members 22 and 23 secured to the door frame for engagement with a recess 24 formed in the top frame member 3 of the safe compartment or inclosure.

A plate or bar 25, carrying a rack 26 for co-operative engagement with a pinion 27 rotatably mounted in the door frame members in any suitable manner, is secured to the bolts 18 and 19 as shown at 28 and 29 in order that clockwise movement of the pinion 27 engaging with the rack 26 will slide the bolts 18 and 19 into locking engagement with the recesses 20 in the opposite door and so that counterclockwise movement will release the bolts from their engagement with the opposite door and unlock it. The bolt 18 is provided with a rack 30 adapted to engage with an idling pinion 31 rotatably mounted in the frame of the door, and the bolt 21 is also provided with a rack 32 for cooperative engagement with the pinion 31, while a recess 33 is provided in the bolt 18 for reception of the lower end of the bolt 21 when withdrawn from its recess 24. It will thus be apparent that when the pinion 27 is turned in a counterclockwise direction it will not only release the bolts 18 and 19 from their locking recesses in the door 11 but it will also, through the intermediary of racks 30 and 32 and idling pinion 31, withdraw the bolt 21 from its locking recess 24.

The pinion 27 is rotatably arranged upon a hollow shaft 34 secured to the rear frame member 12 such as shown in Fig. 2, and the various parts of the bolt operating mechanism and the bolts are so constructed and arranged that an ordinary lock tumbler operating key, upon insertion in the slot 35 in the barrel of the lock will operate them. The operation may be accomplished without the use of bolt operating handles such as are commonly provided, and the key alone may serve to swing the doors upon their hinges. The limits of rotation of the key barrel or cylinder and therefore of the key are, of course, determined by the limits of movements of the bolts. Preferably, the doors are arranged to be simultaneously opened through mechanism indicated at 36 and particularly described and claimed in my Patent No. 1,577,836, dated March 16, 1926, and assigned to the assignee of this case. It will be apparent and understood that any lock mechanism whatsoever that may be operated through the medium of a single key is intended to be incorporated in the pinion 27 as such mechanisms are well known in the art. As each of the teeth of the pinion 27 constitutes a projection rigidly secured to the key operable member and as adjacent teeth on the rack 26 provide opposed shoulders between which one tooth of the pinion 27 engages, I may refer to this mechanism in just such manner in the claims.

From the foregoing description, taken in connection with the drawing, it is believed that the construction and operation of the locking mechanism will be clearly understood. It will also be appreciated that, since many variations and modifications may be made of this structure within the spirit of my invention and the scope of the appended claims, I do not desire to be limited to the details of construction and operation shown and described.

I claim:

1. A double door locking mechanism for safes comprising, a key operable pinion, a member, including a rack for engaging said pinion, carrying a plurality of horizontally slidable locking bolts, a second rack carried by one of said bolts, a vertically slidable locking bolt having a rack associated therewith, and a pinion for operatively connecting the two last said racks.

2. A double door locking mechanism comprising, a horizontally movable locking bolt, a vertically movable locking bolt, a key operable lock including a pinion, a rack connected to said horizontally movable bolt and operably connected to said pinion, and mechanism including a second pinion operably connected to said vertically movable bolt for locking and unlocking movements thereof simultaneously with and in the order of locking and unlocking movements of said horizontally movable bolt.

3. A double door locking mechanism comprising, a pair of horizontally movable locking bolts mounted on one door in spaced relation to one another and adapted to lockingly engage the opposite and cooperative door, means rigidly connecting said bolts for their simultaneous operation, a vertically movable locking bolt mounted on the first said door and adapted to lockingly engage a door frame member, a key operable lock mounted in the first said door for rotation between limits, an operative connection between said lock and said means connecting said horizontally movable bolts for projecting and retracting the same into and from engagement with the opposite door when said lock is rotated in opposite directions respectively and a connection between one of said horizontally movable bolts and said vertically movable bolt for projecting and retracting the latter as and when the former is projected and retracted, respectively.

4. A double door locking mechanism comprising, a bolt carrying member, having a plurality of locking bolts secured thereto in spaced relation, mounted on one door for bodily movement toward and from the opposite and cooperative door, said bolts being adapted to be received in cooperative recesses in the opposite door, a key operable member rotatably mounted in the first said door, means connecting said key operable member and said bolt carrying member whereby rotative movement of said key operable member will bodily move said bolt carrying member to engage and disengage said bolts in the recesses of the said opposite and cooperative door, a bolt mounted on the first said door for movement at an angle to the line of movement of the first said bolts and adapted to be received in a recess in a door frame member, and means connecting the said last bolt and said bolt carrying member whereby the last said bolt may be projected and retracted into and out of locking engagement with said recess in said door frame member, when said bolt carrying member is bodily moved to engage and disengage the bolts it carries with and from, respectively the recesses in said opposite and cooperative door.

5. A double door locking mechanism comprising, a pair of spaced, horizontally movable bolts mounted on one door and adapted to be received at one end of each in corresponding recesses formed in the opposite and cooperative door, a plate secured to, joining and bodily movable with said bolts, a vertically movable locking bolt mounted on the first said door and adapted to be received in a recess in a door frame member, means connected with said bolt and plate for moving said vertically movable bolt into and out of locking engagement in said recess in a door frame member as said horizontally movable bolts are moved into and out of locking engagement with the recesses in the cooperative door, respectively, and a key operable member rotatably mounted in the first said door and operably connected with said plate for moving said plate bodily in a horizontal path whereby all of said bolts may be locked and unlocked, respectively, simultaneously.

In witness hereof I have affixed my signature.

JOSEPH J. MARIOTTI.